(12) United States Patent
Wallenius

(10) Patent No.: US 8,144,599 B2
(45) Date of Patent: Mar. 27, 2012

(54) BINARY CLASS BASED ANALYSIS AND MONITORING

(75) Inventor: Eero Wallenius, Kangasala (FI)

(73) Assignee: Nokia Corporation, Espoo (FI)

( * ) Notice: Subject to any disclaimer, the term of this patent is extended or adjusted under 35 U.S.C. 154(b) by 1193 days.

(21) Appl. No.: 11/111,802

(22) Filed: Apr. 22, 2005

(65) Prior Publication Data

US 2006/0153083 A1 Jul. 13, 2006

(30) Foreign Application Priority Data

Jan. 7, 2005 (FI) ..................................... 20050017

(51) Int. Cl.
*G01R 31/08* (2006.01)
(52) U.S. Cl. ........................................ 370/241; 370/252
(58) Field of Classification Search .................. 709/224, 709/226; 370/236.1, 236.2, 241.1, 249, 252, 370/397
See application file for complete search history.

(56) References Cited

U.S. PATENT DOCUMENTS

| | | | | |
|---|---|---|---|---|
| 5,317,564 A | * | 5/1994 | Nugent | 370/252 |
| 5,552,558 A | * | 9/1996 | Kempf et al. | 549/552 |
| 5,552,588 A | * | 9/1996 | Schneider | 235/385 |
| 6,320,585 B1 | * | 11/2001 | Engel et al. | 345/440 |
| 6,434,118 B1 | * | 8/2002 | Kirschenbaum | 370/236.1 |
| 2002/0133584 A1 | | 9/2002 | Greuel et al. | |
| 2003/0204595 A1 | * | 10/2003 | Lev et al. | 709/226 |
| 2005/0228880 A1 | * | 10/2005 | Champlin | 709/224 |

FOREIGN PATENT DOCUMENTS

| | | |
|---|---|---|
| CA | 2325254 | 6/2001 |
| EP | 0589484 | 5/1994 |
| WO | WO 99/20034 | 4/1999 |

OTHER PUBLICATIONS

Chinese Office Action issued in connection with corresponding Chinese Application No. 200680001621.5; Date of Notification: May 27, 2010; 10 sheets.

* cited by examiner

*Primary Examiner* — Ricky Ngo
*Assistant Examiner* — David Oveissi
(74) *Attorney, Agent, or Firm* — Alston & Bird LLP

(57) ABSTRACT

The invention concerns binary class based analyzing and monitoring. Data relating to indicators relating to at least one of: a communications network resource, a communications network service, and a service provided over a communications network, is collected. Value ranges of the indicators are divided into value range classes, and a binary code is assigned to each class. The collected data is classified by translating each piece of the collected data into the binary code assigned to its associated value range class. The classified data is monitored for changes. The invention allows significantly faster analyzing and monitoring of a communications network, network resources, network services and services provided over the network.

10 Claims, 7 Drawing Sheets

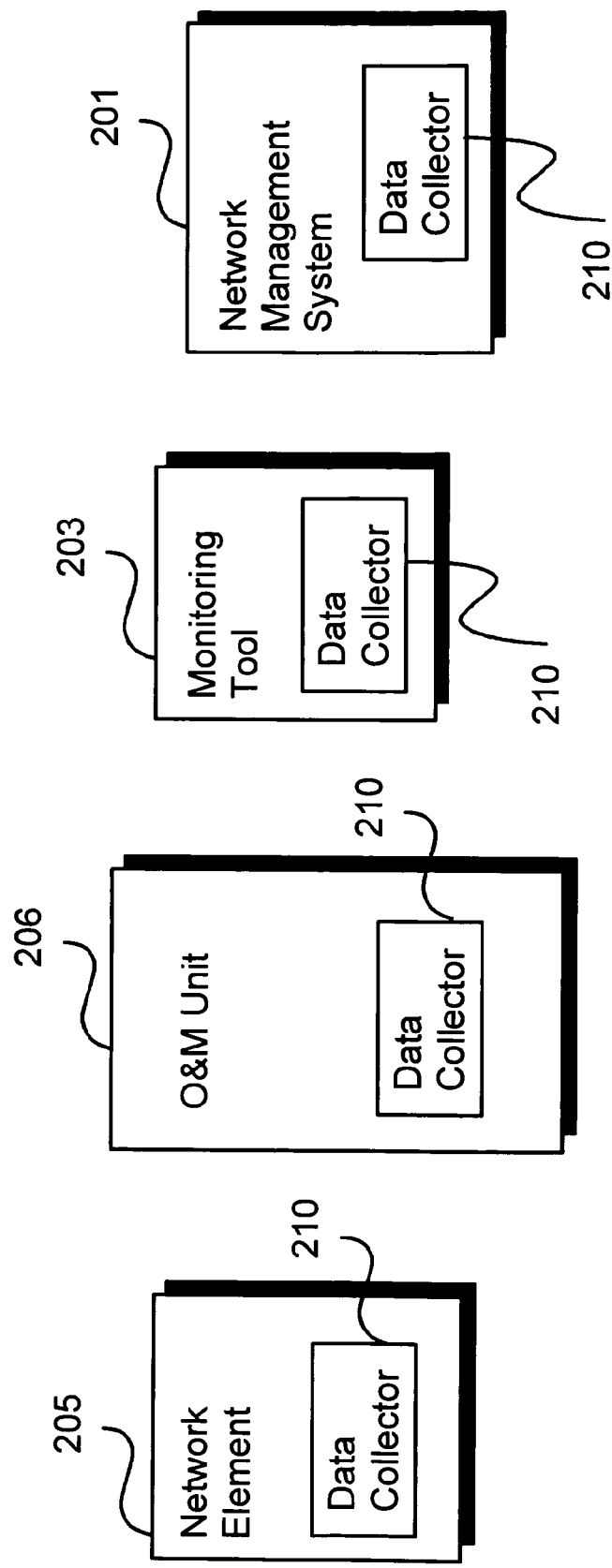

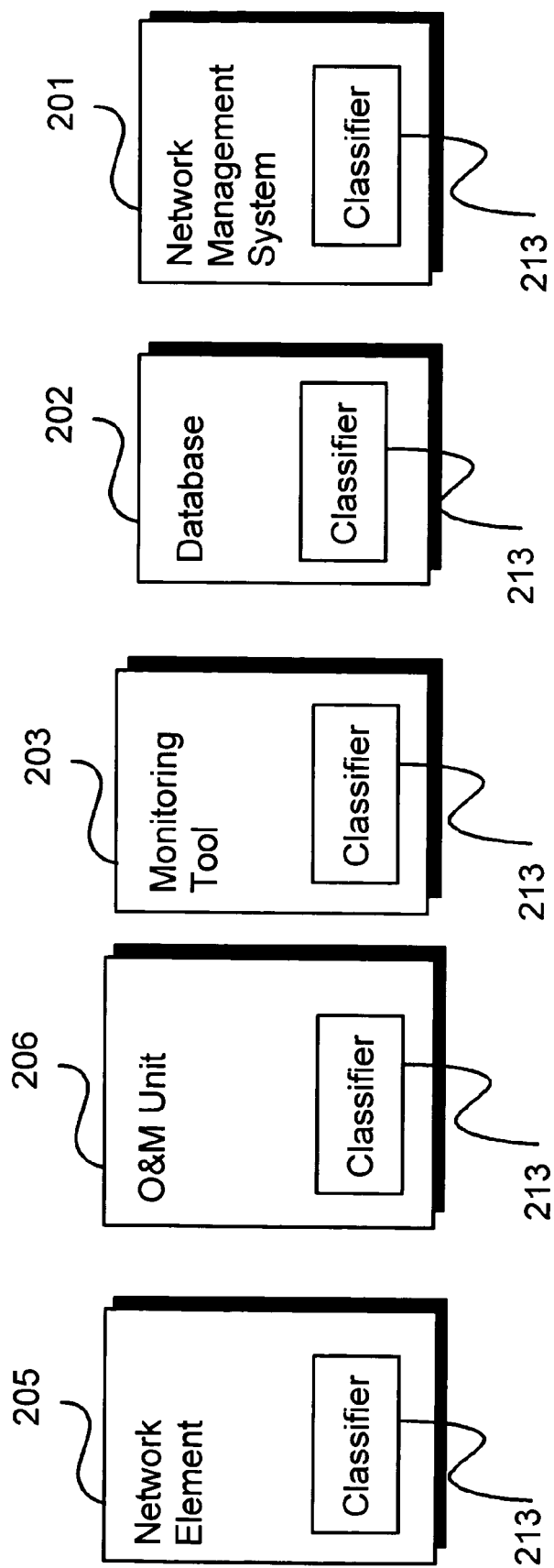

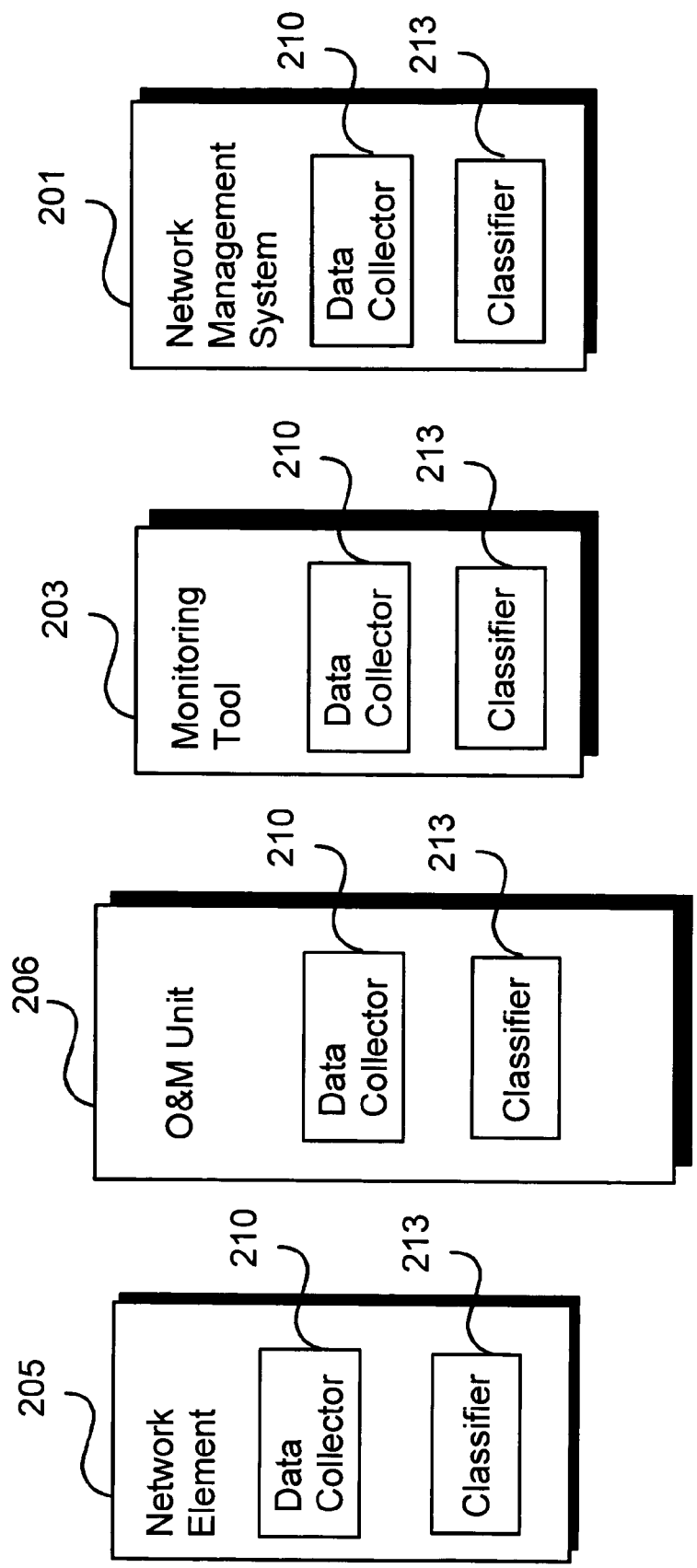

BINARY CLASS BASED ANALYSIS AND MONITORING

BACKGROUND OF THE INVENTION

1. Field of the Invention

The invention relates to communication networks. In particular, the invention relates to analyzing and monitoring for a communications network and its services in a novel and improved way.

2. Description of the Related Art

Today communications networks, such as mobile telecommunications networks, typically comprise a large number of various network elements including base stations, switching centers, various gateways etc. Typically a large communications network may comprise tens of thousands of network elements. And still the networks continue to grow as more and more services are developed.

To maintain, monitor and manage these large and complex networks, there have been developed network management systems in which network management information is collected. The information is typically received from Operation and Maintenance (O&M) units internal or external to a network element, or by probing with an external monitoring tool. Typically the collected information can be presented to network management personnel or operators in various ways to facilitate an operator to make informed management decisions. Typically the collected information is numerical and it is also presented in a numerical form. That is, e.g. a measured piece of numerical performance data is typically presented to the network management personnel as is.

Typically a network management system comprises fault management and performance management. Fault management involves monitoring notifications and alarms generated by various network elements, O&M units and the network management system itself, indicating status changes and detected faults, evaluating their importance and effects, and initiating actions, like repairs. Performance management, on the other hand, involves collecting performance measurements from various network elements, O&M units etc. to the network management system, and subsequently analyzing the collected data. Thus e.g. trends and problems in the network can be detected. However, in a typical prior art system fault management and performance management are separate from each other, and thus e.g. root cause analysis typically cannot be satisfactorily performed.

The collected performance measurements typically relate to parameters which can be used to indicate the performance of the network or a network element, or a service provided by the network. Such parameters are also referred to as performance indicators in the art. Examples of performance indicators include number of call attempts, number of blocked calls, number of dropped calls, handover failure rates, delay associated with a given connection, and throughput associated with a given connection, as well as measurements like memory usage, CPU usage, process status etc. The performance measurements are typically transmitted to the network management system sequentially, e.g. every 15, 30 or 60 minutes or every 12 or 24 hours, depending on the network, e.g. the network size, the amount of different kind of measurements to be collected, and the capacity of the network management system. Having received the collected performance measurements, the network management system analyzes them. Typically the analysis is performed by batch processing in which the received data is analyzed e.g. once every 24 hours.

Current implementations typically use e.g. various algorithm based methods for the analysis. A performance indicator has a range of values associated with it. Based on measurements collected over a relatively long time, a normal value or sub-range of values for a given performance indicator may be determined. Correspondingly, based on recently collected measurements, a current value for the same performance indicator may be determined. Thus, it may be determined for example, whether the current value deviates from the normal value enough for an operator to look into the matter.

Prior art also includes application WO 99/20034 of Rajala, Antti, filed Oct. 13, 1998, which is commonly assigned with the present application. The disclosure of this application is incorporated by reference herein. WO 99/20034 relates to monitoring and maintaining a network in telecommunications networks which comprise a large number of network elements. The network elements are presented as a hierarchical diagram or as a map display on a graphical user interface. The graphical user interface presents performance information of the network element as a graphical presentation in connection with the network element symbol in such a way that the operator can, at one glance, identify the network elements that are the most important in terms of the operation of the network or the network elements most affected by faults. The measurement results are post processed by a network management system when they are received, e.g. every 15, 30 or 60 minutes. Thus, WO 99/20034 fails to disclose a real time system. In addition, monitoring and maintaining as disclosed by WO 99/20034 requires a vast amount of calculation capacity and database capacity.

As current networks continue to grow exponentially, there is more and more need for faster network management including monitoring of network resources, network services and services provided over the network. In particular, analysis of the collected performance measurements has proven problematic. Firstly, the current implementations typically perform the analysis as an off-line procedure, for example once every 24 hours. In other words, the analysis is not performed in real-time which may seriously degrade the performance of the network or the quality of service since performance problems may remain unattended to until the next batch processing of collected performance measurements. Furthermore, the present algorithm based analysis methods do not allow real-time decision making and monitoring either. Typically, current algorithm based methods use 1,000-10,000 CPU cycles to calculate a specific response. And further, the current implementations do not allow real root cause analysis due to separate fault management and performance management, and due to a vast amount of calculation capacity required from such an analysis system if implemented on top of current implementations.

Therefore, the object of the present invention is to alleviate the problems described above and to introduce a solution that allows analysis and monitoring for a communications network, network resources, network services and services provided over the network significantly faster than previously, even in real-time.

SUMMARY OF THE INVENTION

A first aspect of the present invention is an analyzing and monitoring method. In accordance with the method, at least one indicator is defined which indicator relates to at least one of: a communications network resource, a communications network service, a service provided over a communications network. The communications network may be a wireless network, wired network, or a combination thereof. A value range of the at least one indicator is divided into value range classes. Then a binary code is assigned to each value range class of the at least one indicator. Data relating to the at least one indicator is collected. The collected data is classified by translating at least one piece of the collected data into that binary code which is assigned to its associated value range class. The classified data is monitored for changes, and at least one monitored change in the classified data is reported.

A second aspect of the present invention is an analyzing and monitoring system. The system comprises a data collector for collecting data relating to at least one predefined indicator, the at least one indicator relating to at least one of: a communications network resource, a communications network service, a service provided over a communications network. The system further comprises a divider for dividing a value range of the at least one indicator into value range classes. The system further comprises an assigner for assigning a binary code to each value range class. The system further comprises a classifier for classifying the collected data by translating at least one piece of the collected data into the binary code assigned to its associated value range class. The system further comprises a monitor for monitoring the classified data for changes. The system further comprises a reporter for reporting at least one monitored change in the classified data.

A third aspect of the present invention is an analyzing and monitoring system. The system comprises a data collecting means for collecting data relating to at least one predefined indicator, the at least one indicator relating to at least one of: a communications network resource, a communications network service, a service provided over a communications network. The system further comprises a dividing means for dividing a value range of the at least one indicator into value range classes. The system further comprises an assigning means for assigning a binary code to each value range class. The system further comprises a classifying means for classifying the collected data by translating at least one piece of the collected data into the binary code assigned to its associated value range class. The system further comprises a monitoring means for monitoring the classified data for changes. The system further comprises a reporting means for reporting at least one monitored change in the classified data.

A fourth aspect of the present invention is a classifier for classifying data. The classifier is configured to classify received data, the received data relating to at least one predefined indicator a value range of which having been divided into value range classes and the at least one indicator relating to at least one of: a communications network resource, a communications network service, a service provided over a communications network, and a binary code has been assigned to each value range class of the at least one indicator; by translating at least one piece of the received data into the binary code assigned to its associated value range class.

A fifth aspect of the present invention is a computer program embodied on a computer readable medium. The computer program controls a data-processing device to perform the steps of: dividing a value range of at least one predefined indicator into value range classes, the at least one indicator relating to at least one of: a communications network resource, a communications network service, a service provided over a communications network; assigning a binary code to each value range class of the at least one indicator; collecting data relating to the at least one indicator; classifying the collected data by translating at least one piece of the collected data into the binary code assigned to its associated value range class; monitoring the classified data for changes; and reporting at least one monitored change in the classified data.

A sixth aspect of the present invention is a computer program embodied on a computer readable medium. The computer program controls a data-processing device to perform the step of: classifying received data, said received data relating to at least one predefined indicator a value range of which has been divided into value range classes and said at least one indicator relating to at least one of: a communications network resource, a communications network service, a service provided over a communications network, and a binary code having been assigned to each value range class of the at least one indicator; by translating at least one piece of the received data into the binary code assigned to its associated value range class.

In an embodiment of the invention, the state of at least part of the communications network or the state of a communications network service provided over the communications network is analyzed by an analyzer based on the reported at least one change in the classified data.

In an embodiment of the invention, a graphical representation of the analyzed state of the at least part of the communications network or the analyzed state of the communications network service provided over the communications network is displayed by a graphical user interface.

In an embodiment of the invention, the data collector is implemented in at least one of the following: a network element of the communications network, an operation and maintenance unit of a network element of the communications network, a monitoring tool connected to the communications network, and a network management system managing at least part of the communications network.

In an embodiment of the invention, the classifier is implemented in at least one of the following: a network element of the communications network, an operation and maintenance unit of a network element of the communications network, a monitoring tool connected to the communications network, a database storing the collected data, and a network management system managing at least part of the communications network.

In an embodiment of the invention, both the data collector and the classifier are implemented in at least one of the following: a network element of the communications network, an operation and maintenance unit of a network element of the communications network, a monitoring tool connected to the communications network, and a network management system managing at least part of the communications network.

In an embodiment of the invention, the analyzer is implemented in a network management system managing at least part of the communications network.

In an embodiment of the invention, both the classifier and the analyzer are implemented in a network management system managing at least part of the communications network.

The invention allows analyzing and monitoring significantly faster than prior art implementations. If, for example, value range classes are assigned four bit binary codes, sixteen separate value range classes are possible. Thus, by using a 64-bit CPU 256 value range classes can be tested in one CPU cycle. Thus, in comparison to the above 1,000-10,000 CPU cycles for calculating one response with prior art, the present invention allows performance gain of 1,000-10,000. Furthermore, since in an embodiment of the invention changes in the classified data are reported to the analysis and monitoring system comprised in the communications network, information is transmitted to the analysis and monitoring system only when there are changes in the classified data. As a result, the amount of information transmitted between the analysis and monitoring system and the network elements, the O&M units, NMS systems, performance measurement databases, the probing tools and the like, and consequently network load, is reduced considerably compared to prior art arrangements.

And further, because data classification is done in a distributed manner, it allows even a real time monitoring capability for a communications network, network resources, network services and services provided over the network.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 2c is a block diagram illustrating implementation of a data collector according to an embodiment of the present invention, FIG. 2d is a block diagram illustrating another implementation of a data collector according to an embodiment of the present invention, FIG. 2e is a block diagram illustrating yet another implementation of a data collector according to an embodiment of the present invention, FIG. 2f is a block diagram illustrating yet another implementation of a data collector according to an embodiment of the present invention, FIG. 2g is a block diagram illustrating implementation of a classifier according to an embodiment of the present invention, FIG. 2h is a block diagram illustrating another implementation of a classifier according to an embodiment of the present invention, FIG. 2i is a block diagram illustrating yet another implementation of a classifier according to an embodiment of the present invention, FIG. 2j is a block diagram illustrating yet another implementation of a classifier according to an embodiment of the present invention, FIG. 2k is a block diagram illustrating yet another implementation of a classifier according to an embodiment of the present invention, FIG. 2l is a block diagram illustrating implementation of a data collector and a classifier according to an embodiment of the present invention, FIG. 2m is a block diagram illustrating another implementation of a data collector and a classifier according to an embodiment of the present invention, FIG. 2n is a block diagram illustrating yet another implementation of a data collector and a classifier according to an embodiment of the present invention, FIG. 2o is a block diagram illustrating yet another implementation of a data collector and a classifier according to an embodiment of the present invention.

DETAILED DESCRIPTION OF THE PREFERRED EMBODIMENTS

Reference will now be made in detail to the embodiments of the invention, examples of which are illustrated in the accompanying drawings.

Figure 1:
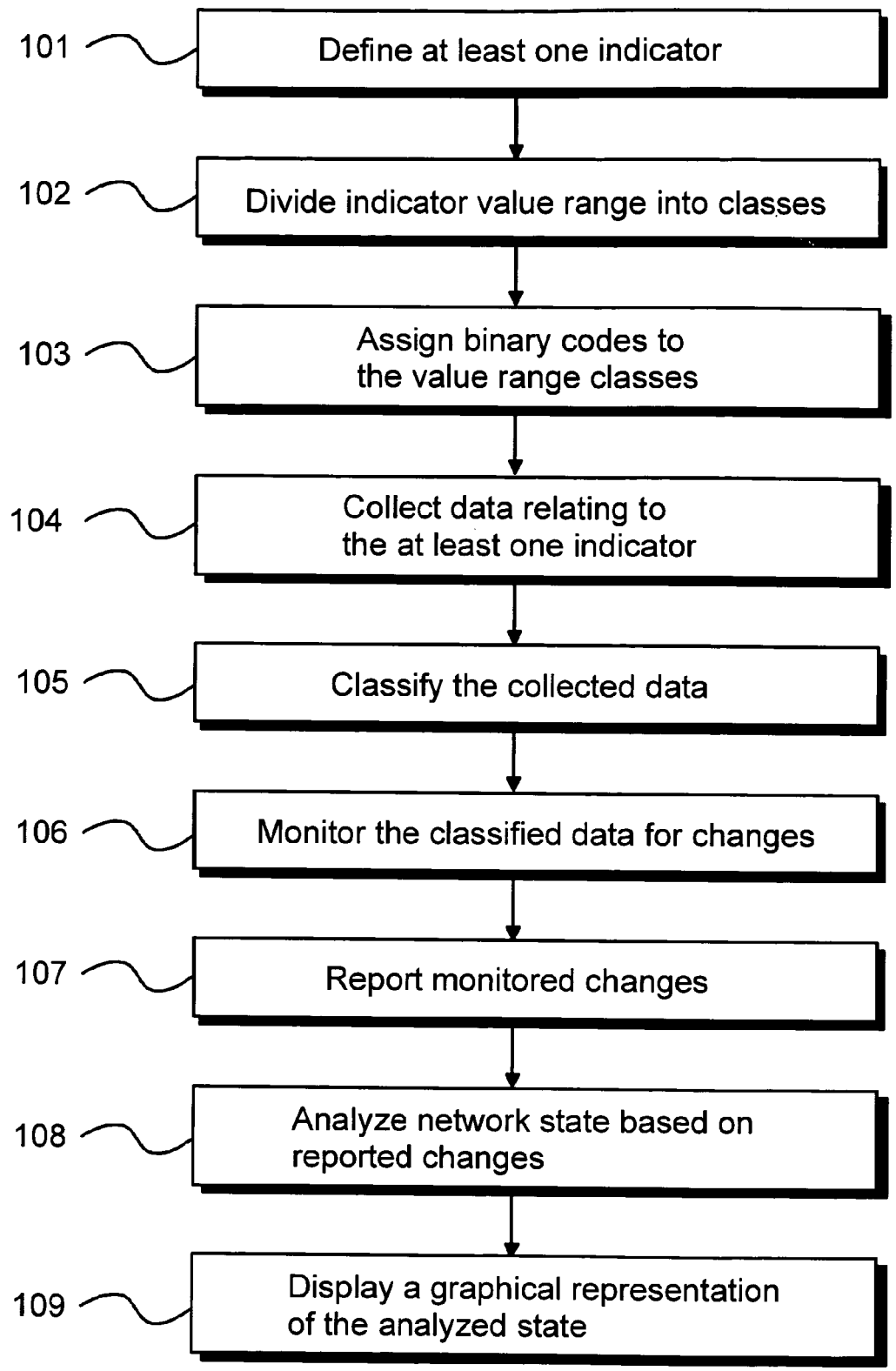
FIG. 1 is a graphical representation illustrating a method according to an embodiment of the present invention.

FIG. 1 illustrates an exemplary embodiment of the method of the present invention relating to binary class based analyzing and monitoring.

In the exemplary embodiment of FIG. 1 at least one indicator is first defined, step 101. The at least one defined indicator relates to at least one of: a communications network resource, a communications network service, a service provided over a communications network. The at least one indicator may be e.g. number of call attempts, number of blocked calls, number of dropped calls, handover failure rates, delay associated with a given connection, and/or throughput associated with a given connection. In the exemplary embodiment of FIG. 1, each indicator has a value range. For example, when the indicator is delay, the value range may be e.g. 1 ms-100 ms.

Next, at step 102, the value range of the at least one indicator is divided into value range classes. Then, at step 103, a binary code is assigned to each value range class of the at least one indicator. Continuing the above example of the indicator being delay, the value range of 1 ms-100 ms may be divided into e.g. four value range classes: the first class being e.g. the values 25 ms and below, the second class being the values from 26 ms to 50 ms, the third class being the values from 51 ms to 75 ms, and the fourth class being the values 76 ms and above. Since there are only four classes, two bit binary codes will be sufficient for representation of all the classes. The binary code assigned to the first value range class may be e.g. '00', the binary code assigned to the second value range class may be e.g. '01', the binary code assigned to the third value range class may be e.g. '10', and the binary code assigned to the fourth value range class may be e.g. '11'. The value range classes may be of equal size or their sizes may differ. Data relating to the at least one indicator is collected, step 104. Continuing the above example of the indicator being delay, the collected data may be delay values measured during the last 30 minutes, for example.

In an embodiment, the various indicators are each unique to their respective communications network resource, communications network service, or service provided over the communications network. That is, data relating to a given indicator, e.g. the above delay, is collected only from one communications network resource, communications network service, or service provided over the communications network. In another embodiment, one or more indicators are common to two or more communications network resources, communications network services, or services provided over the communications network. That is, data relating to a given indicator, e.g. the above delay, is collected from two or more communications network resources, communications network services, or services provided over the communications network. However, even if the data relating to the given indicator is collected from the two or more communications network resources, communications network services, or services provided over the communications network, the value ranges of the indicators common to these communications network resources, communications network services, or services provided over the communications network may still be different from each other. That is, an indicator 'delay' associated with a first communications network resource, communications network service, or service provided over the communications network may have a first value range which is different from a second value range of an indicator 'delay' associated with a second communications network resource, communications network service, or service provided over the communications network.

Next, at step 105, the collected data is classified by translating at least one piece of the collected data into that binary code which is assigned to its associated value range class. To illustrate and continuing the above example, if a given piece of the collected data related to the indicator 'delay' is '13 ms', it will be translated to '00'. Correspondingly, if another piece of the collected data related to the indicator 'delay' is '57 ms', it will be translated to '10', and so on.

In an embodiment, the division into the value range classes and the subsequent assignment of the binary codes may performed once, e.g. while initiating the network management system, and amendments to the division and/or the assignment may be done later on if needed. In another embodiment, the division and/or the assignment may be performed each time data is received for classification. The classified data is monitored for changes, step 106. If at least one change in the classified data is monitored, the at least one change is reported, step 107. That is, continuing the above example, if one piece of the classified data is e.g. '00' and the subsequent piece of the classified data is '10', it may be reported e.g. in order to allow an operator to look into the matter.

Further in the exemplary embodiment of FIG. 1, the state of at least part of the communications network or the state of a communications network service provided over the communications network is analyzed by an analyzer based on the reported at least one change in the classified data, step 108. At step 109, a graphical representation of the analyzed state of the at least part of the communications network or the analyzed state of the communications network service provided over the communications network is displayed by a graphical user interface.

Figure 2A:
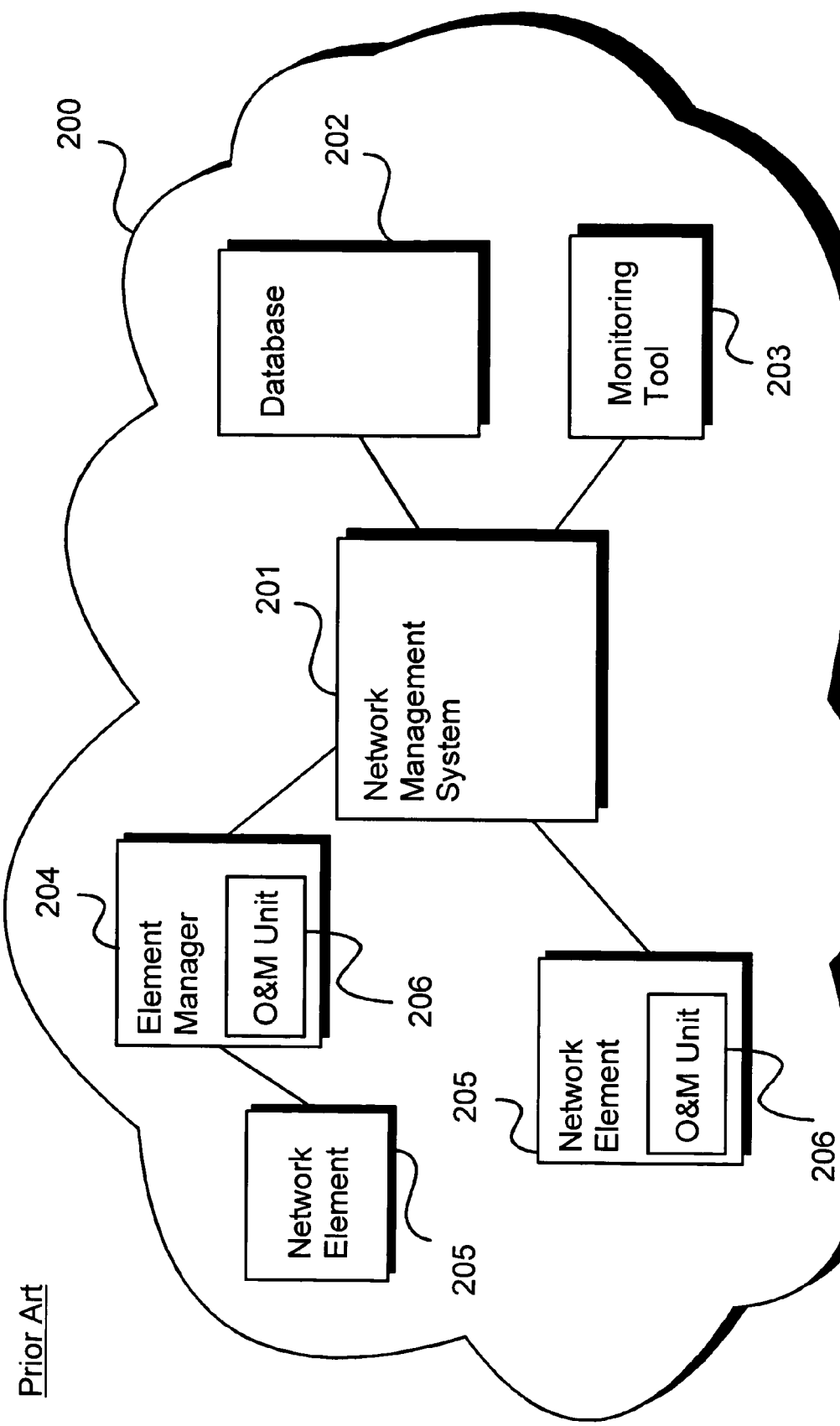
FIG. 2a is a block diagram illustrating components of a prior art communications network.

FIG. 2a illustrates such components of a prior art communications network that are relevant to the implementation of the present invention. A communications network 200 is illustrated in FIG. 2a. The communications network 200 may be e.g. a General Packet Radio Service enabled mobile telecommunications network. Generally, however, the communications network 200 in accordance with the present invention may be a wired communications network or a wireless communications network or a combination thereof.

The communications network 200 of FIG. 2a comprises network elements 205 which may be e.g. Base Transceiver Stations, Mobile Services Centers, Serving GPRS Support Nodes, and/or Gateway GPRS Support Nodes. For the sake of clarity only two network elements 205 are illustrated in FIG. 2a. In actual communications networks, however, there may be e.g. thousands of network elements 205, as is known to those skilled in the art.

The communications network 200 of FIG. 2a further comprises a network management system 201. As is known to those skilled in the art, the network management system 201 may be implemented e.g. as a local area network to which various servers implementing the various functions of the network management system 201 and work stations used by network management operators are connected. The network management system 201 may be connected to the various network elements 205 via connections dedicated solely for network management purposes, and/or communications connections of the network 200 may be used to relay network management information also.

The communications network 200 of FIG. 2a further comprises a database 202, a monitoring tool 203, an element manager 204, and Operation and Maintenance units 206. As is illustrated in FIG. 2a, the Operation and Maintenance units 206 may be internal or external to the network elements 205. That is, an Operation and Maintenance unit 206 may be embedded to a network element 205. Alternatively, an Operation and Maintenance unit 206 may be embedded e.g. to the element manager 204 which in turn is connected to one or more network elements 205, as well as to the network management system 201.

Figure 2B:
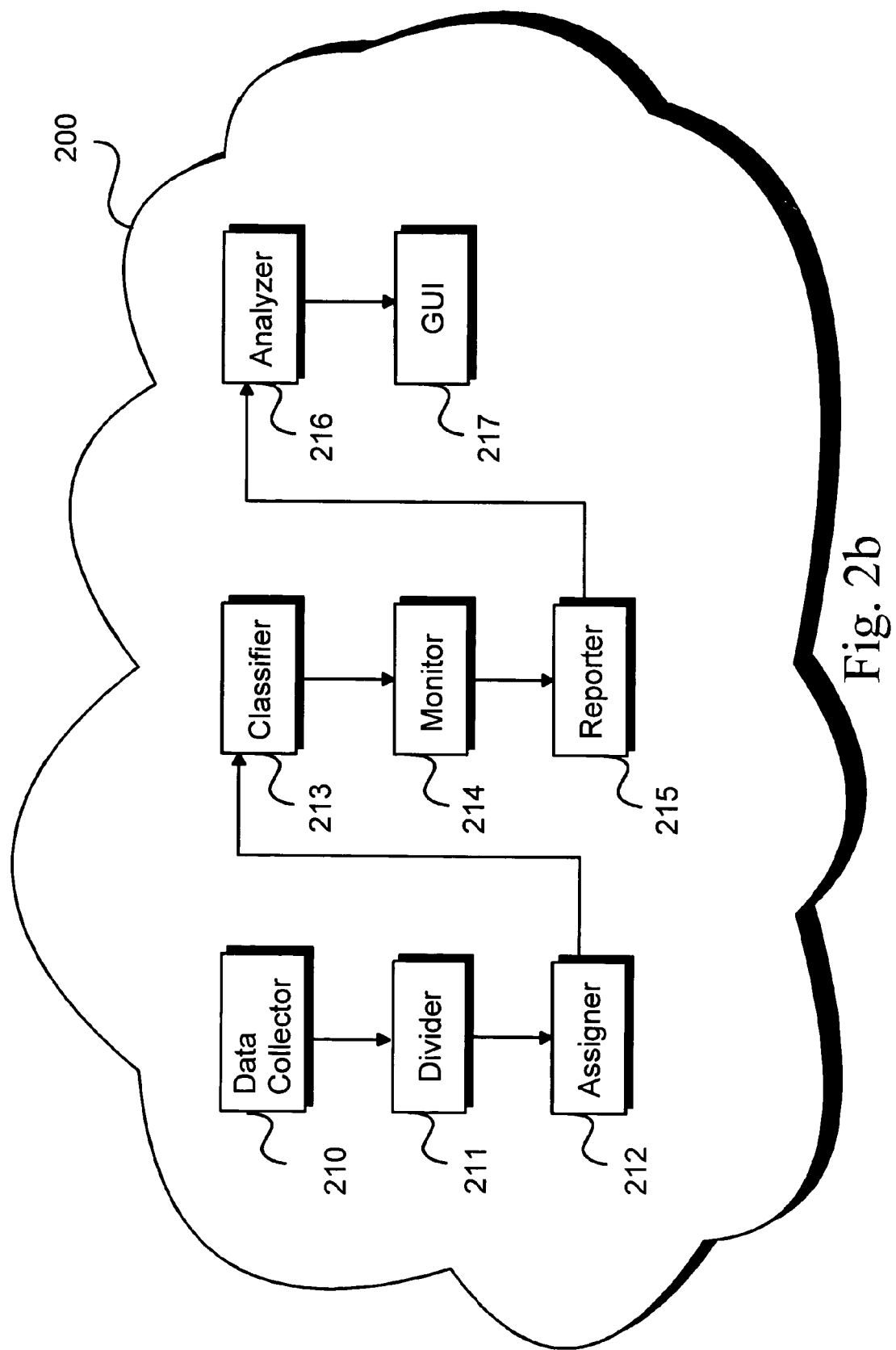
FIG. 2b is a block diagram illustrating a system according to an embodiment of the present invention.

FIG. 2b illustrates an analyzing and monitoring system according to an embodiment of the present invention. The exemplary embodiment of the system of the invention illustrated if FIG. 2b comprises a data collector 210 for collecting data relating to at least one predefined indicator, the at least one indicator relating to at least one of: a communications network resource, a communications network service, a service provided over a communications network. The system further comprises a divider 211 for dividing a value range of the at least one indicator into value range classes. The system further comprises an assigner 212 for assigning a binary code to each value range class.

The exemplary embodiment of the system of the invention illustrated in FIG. 2b further comprises a classifier 213 for classifying the collected data by translating at least one piece of the collected data into the binary code assigned to its associated value range class. The system further comprises a monitor 214 for monitoring the classified data for changes. The system further comprises a reporter 215 for reporting at least one monitored change in the classified data.

The exemplary embodiment of the system of the invention illustrated in FIG. 2b further comprises an analyzer 216 for receiving the at least one reported change in the classified data, and for analyzing the state of at least part of the communications network or the state of a communications network service provided over the communications network based on said at least one reported change. The system further comprises a graphical user interface 217 for displaying a graphical representation of the analyzed state. The graphical user interface 217 may be arranged e.g. in connection with a work station (not illustrated in FIG. 2b) to be used by a network management operator. The reporter 215 may utilize e.g. a Fault Management Pipe or an SNMP (Simple Network Management Protocol) trap for sending the reports to the analyzer 216. As is known in the art, the term 'SNMP trap' refers to an alarm generated by network equipment provided with an SNMP agent to inform network supervision of faults occurred in them.

The data collector 210, divider 211, assigner 212, classifier 213, monitor 214, reporter 215, analyzer 216 and graphical user interface 217 may be implemented in hardware, in software, or in a combination thereof.

Figure 2Q:
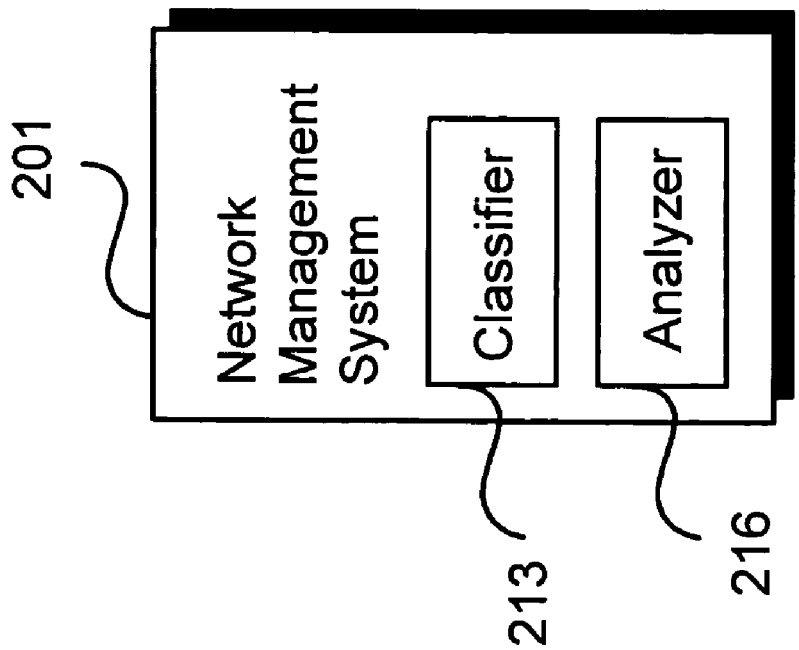
FIG. 2q is a block diagram illustrating another implementation of an analyzer and a classifier according to an embodiment of the present invention.

The data collector 210, divider 211, assigner 212, classifier 213, monitor 214, reporter 215, analyzer 216 and graphical user interface 217 of the exemplary embodiment of the system of the invention illustrated in FIG. 2b are implemented in the communications network 200. The exemplary communications network 200 of FIG. 2b is the same communications network 200 illustrated in FIG. 2a, as indicated by the like numbering. FIGS. 2c to 2q further illustrate various possibilities of how to implement the data collector 210, divider 211, assigner 212, classifier 213, monitor 214, reporter 215, analyzer 216 and graphical user interface 217 of the invention to the prior art communications network components of FIG. 2a.

FIGS. 2c to 2f illustrate various possibilities of how to implement the data collector 210 of the invention to the prior art communications network components of FIG. 2a. As illustrated in FIG. 2c, the data collector 210 may be implemented in a network element 205. According to another embodiment, the data collector 210 may be implemented in an Operation and Maintenance unit 206 which may be internal or external to a network element 205, FIG. 2d. According to yet another embodiment, the data collector 210 may be implemented in the monitoring tool 203, FIG. 2e. According to yet another embodiment, the data collector 210 may be implemented in the network management system 201, FIG. 2f.

FIGS. 2g to 2k illustrate various possibilities of how to implement the classifier 213 of the invention to the prior art communications network components of FIG. 2a. As illustrated in FIG. 2g, the classifier 213 may be implemented in a network element 205. According to another embodiment, the classifier 213 may be implemented in an Operation and Maintenance unit 206 which may be internal or external to a network element 205, FIG. 2h. According to yet another embodiment, the classifier 213 may be implemented in the monitoring tool 203, FIG. 2i. According to yet another embodiment, the classifier 213 may be implemented in the database 202 which database 202 may be used for storing the collected data, FIG. 2j. More particularly, the classifier 213 may be arranged e.g. in connection with a database interface (not illustrated in FIG. 2j) of the database 202. According to yet another embodiment, the classifier 213 may be implemented in the network management system 201, FIG. 2k.

FIGS. 2l to 2o illustrate various possibilities of how to implement both the data collector 210 and the classifier 213 of the invention to the prior art communications network components of FIG. 2a. As illustrated in FIG. 2l, the data collector 210 and the classifier 213 may both be implemented in a network element 205. According to another embodiment, the data collector 210 and the classifier 213 may both be implemented in an Operation and Maintenance unit 206 which may be internal or external to a network element 205, FIG. 2m. According to yet another embodiment, the data collector 210 and the classifier 213 may both be implemented in the monitoring tool 203, FIG. 2n. According to yet another embodiment, the data collector 210 and the classifier 213 may both be implemented in the network management system 201, FIG. 2o.

Figure 2P:
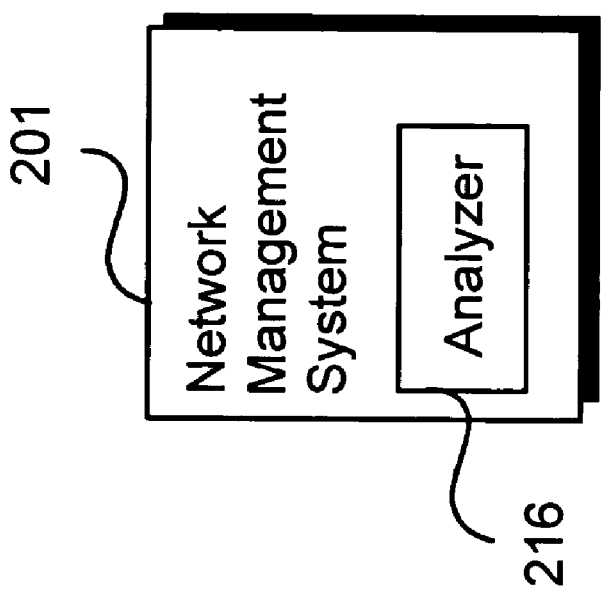
FIG. 2p is a block diagram illustrating implementation of an analyzer according to an embodiment of the present invention.

FIGS. 2p to 2q illustrate various possibilities of how to implement the analyzer 216 and/or the classifier 213 of the invention to the prior art communications network components of FIG. 2a. As illustrated in FIG. 2p, the analyzer 216 may be implemented in the network management system 201. According to another embodiment, the analyzer 216 and the classifier 213 may both be implemented in the network management system 201, FIG. 2q.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method, comprising:
defining at least one indicator relating to at least one of a communications network resource, a communications network service, or a service provided over a communications network, said communications network being a wireless network, wired network, or a combination thereof;
dividing a value range of the at least one indicator into value range classes;
assigning a binary code to each of the value range classes of the at least one indicator;
collecting data relating to the at least one indicator;
classifying the collected data by translating at least one piece of the collected data into the binary code assigned to an associated value range class;
monitoring the classified data in real time to detect changes in value range class of the classified data; and in an instance in which a change in value range class is detected based at least in part on the monitoring:
   causing at least one detected change in the classified data to be reported in response to detection of the change in value range class;
   analyzing, by a processor, one or more of a state of at least part of the communications network or a state of a communications network service provided over the communications network in response to the reported at least one detected change in the classified data, the one or more of the state of at least part of the communications network or the state of the communications network service provided over the communications network being analyzed only in an instance in which a change in value range class is detected and reported; and
   causing display of a graphical representation of the analyzed state.

2. The method of claim 1, wherein in an instance in which a plurality of indicators are defined, each defined indicator is unique to a respective one of a communications network resource, communications network service, or service provided over the communications network, and wherein collecting data relating to a respective indicator comprises collecting data only from the one of a respective communications network resource, communications network service, or service provided over the communications network to which the respective indicator is unique.

3. A system, comprising:
a data collector configured to collect data relating to at least one predefined indicator, wherein the at least one predefined indicator relates to at least one of a communications network resource, a communications network service, or a service provided over a communications network, said communications network being a wireless network, wired network, or a combination thereof;
a divider configured to divide a value range of the at least one predefined indicator into value range classes;
an assigner configured to assign a binary code to each of the value range classes;
a classifier configured to classify the collected data by translating at least one piece of the collected data into the binary code assigned to an associated value range class;
a monitor configured to monitor the classified data in real time to detect changes in value range class of the classified data;
a reporter configured to report at least one detected change in the classified data in response to detection of a change in value range class by the monitor;
an analyzer configured to receive the report of at least one detected change in the classified data, and configured to analyze one or more of a state of at least part of the communications network or a state of a communications network service provided over the communications network in response to said at least one reported at least one detected change, wherein the analyzer is configured to analyze the one or more of the state of at least part of the communications network or the state of the communications network service provided over the communications network only in an instance in which a change in value range class is detected and reported; and a display configured to display a graphical representation of the analyzed state.

4. A computer program product comprising at least one non-transitory computer readable storage medium, the at least one non-transitory computer readable storage medium encoded with instructions that, when executed by an apparatus, cause the apparatus to perform a process comprising:

dividing a value range of at least one predefined indicator into value range classes, wherein the at least one predefined indicator relates to at least one of a communications network resource, a communications network service, or a service provided over a communications network, said communications network being a wireless network, wired network, or a combination thereof;

assigning a binary code to each of the value range classes of the at least one predefined indicator;

collecting data relating to the at least one predefined indicator;

classifying the collected data by translating at least one piece of the collected data into the binary code assigned to an associated value range class;

monitoring the classified data in real time to detect changes in value range class of the classified data; and in an instance in which a change in value range class is detected based at least in part on the monitoring:

causing at least one detected change in the classified data to be reported in response to detection of the change in value range class;

analyzing one or more of a state of at least part of the communications network or a state of a communications network service provided over the communications network in response to the reported at least one detected change in the classified data, the one or more of the state of at least part of the communications network or the state of a communications network service provided over the communications network being analyzed only in an instance in which a change in value range class is detected and reported; and causing display of a graphical representation of the analyzed state.

5. A computer program product comprising at least one non-transitory computer readable storage medium, the at least one non-transitory computer readable storage medium encoded with instructions that, when executed by an apparatus, cause the apparatus to perform a process comprising:

classifying received data, wherein said received data relates to at least one predefined indicator, wherein a value range of the at least one predefined indicator is divided into value range classes, wherein said at least one predefined indicator relates to at least one of a communications network resource, a communications network service, or a service provided over a communications network, said communications network being a wireless network, wired network, or a combination thereof, and wherein a binary code is assigned to each of the value range classes of the at least one predefined indicator;

translating at least one piece of the received data into the binary code assigned to an associated value range class;

monitoring the classified data in real time to detect changes in value range class of the classified data; and in an instance in which a change in value range class is detected based at least in part on the monitoring:

causing at least one detected change in the classified data to be reported in response to detection of the change in value range class;

analyzing one or more of a state of at least part of the communications network or a state of the communications network service provided over the communications network in response to the reported at least one detected change in the classified data, the one or more of the state of at least part of the communications network or the state of the communications network service provided over the communications network being analyzed only in an instance in which a change in value range class is detected and reported; and causing display of a graphical representation of the analyzed state.

6. An apparatus, comprising at least one processor and at least one memory storing computer program code, wherein the at least one memory and stored computer program code are configured to, with the at least one processor, cause the apparatus to at least:

define at least one indicator relating to at least one of a communications network resource, a communications network service, or a service provided over a communications network, said communications network being a wireless network, wired network, or a combination thereof;

divide a value range of the at least one indicator into value range classes;

assign a binary code to each of the value range classes of the at least one indicator;

collect data relating to the at least one indicator;

classify the collected data by translating at least one piece of the collected data into the binary code assigned to an associated value range class;

monitor the classified data in real time to detect changes in value range class of the classified data; and in an instance in which a change in value range class is detected based at least in part on monitoring the classified data:

cause at least one detected change in the classified data to be reported in response to detection of the change in value range class;

analyze one or more of a state of at least part of the communications network or a state of a communications network service provided over the communications network in response to the reported at least one detected change in the classified data, the one or more of the state of at least part of the communications network or the state of a communications network service provided over the communications network being analyzed only in an instance in which a change in value range class is detected and reported; and cause display of a graphical representation of the analyzed state.

7. The apparatus of claim 6, wherein the apparatus comprises or is implemented in at least one of a network element of the communications network, an operation and maintenance unit of the network element of the communications network, a monitoring tool operatively connected to the communications network, a database configured to store the collected data, or a network management system configured to manage at least part of the communications network.

8. An apparatus, comprising:
means for classifying collected data relating to at least one predefined indicator by translating at least one piece of the collected data into a binary code assigned to an associated value range class, wherein the at least one predefined indicator relates to at least one of a communications network resource, a communications network service, or a service provided over a communications network, said communications network being a wireless network, wired network, or a combination thereof;
means for dividing a value range of the at least one predefined indicator into value range classes;
means for monitoring the classified data in real time to detect changes in value range class of the classified data;
means for causing at least one detected change in the classified data to be reported in response to detection of a change in value range class;
means for analyzing one or more of a state of at least part of the communications network or a state of the communications network service provided over the communications network in response to the reported at least one detected change in the classified data, the one or more of the state of at least part of the communications network or the state of the communications network service provided over the communications network being analyzed only in an instance in which a change in value range class is detected and reported; and
means for causing display of a graphical representation of the analyzed state.

9. A method, comprising:
classifying, by a processor, collected data relating to at least one predefined indicator by translating at least one piece of the collected data into a binary code assigned to an associated value range class, wherein the at least one predefined indicator relates to at least one of a communications network resource, a communications network service, or a service provided over a communications network, said communications network being a wireless network, wired network, or a combination thereof;
dividing a value range of the at least one predefined indicator into value range classes;
monitoring the classified data in real time to detect changes in value range class of the classified data; and in an instance in which a change in value range class is detected based at least in part on the monitoring:
causing at least one detected change in the classified data to be reported in response to detection of the change in value range class;
analyzing one or more of a state of at least part of the communications network or a state of the communications network service provided over the communications network in response to the reported at least one detected change in the classified data, the one or more of the state of at least part of the communications network or the state of the communications network service provided over the communications network being analyzed only in an instance in which a change in value range class is detected and reported; and
causing display of a graphical representation of the analyzed state.

10. A computer program product comprising at least one non-transitory computer readable storage medium, the at least one non-transitory computer readable storage medium encoded with instructions that, when executed by an apparatus, cause the apparatus to perform a process comprising:
classifying collected data relating to at least one predefined indicator by translating at least one piece of the collected data into a binary code assigned to an associated value range class, wherein the at least one predefined indicator relates to at least one of a communications network resource, a communications network service, or a service provided over a communications network, said communications network being a wireless network, wired network, or a combination thereof;
dividing a value range of the at least one predefined indicator into value range classes;
monitoring the classified data in real time to detect changes in value range class of the classified data; and in an instance in which a change in value range class is detected based at least in part on the monitoring:
causing at least one monitored change in the classified data to be reported in response to detection of the change in value range class; and
analyzing one or more of a state of at least part of the communications network or a state of the communications network service provided over the communications network in response to the reported at least one monitored change in the classified data the one or more of the state of at least part of the communications network or the state of the communications network service provided over the communications network being analyzed only in an instance in which a change in value range class is detected and reported; and
causing display of a graphical representation of the analyzed state.

* * * * *